US012807241B2

(12) United States Patent
Wimmer et al.

(10) Patent No.: US 12,807,241 B2
(45) Date of Patent: Nov. 24, 2026

(54) WIND DEFLECTOR DEVICE HAVING A WIND DEFLECTOR HOOP

(71) Applicant: Webasto SE, Stockdorf (DE)

(72) Inventors: Rudolf Wimmer, Stockdorf (DE); Thomas Willerer, Stockdorf (DE); Marcel Marquardt, Stockdorf (DE); Sebastian Gattinger, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 721 days.

(21) Appl. No.: 18/043,227

(22) PCT Filed: Oct. 4, 2021

(86) PCT No.: PCT/EP2021/077221

§ 371 (c)(1),
(2) Date: May 15, 2024

(87) PCT Pub. No.: WO2022/078788

PCT Pub. Date: Apr. 21, 2022

(65) Prior Publication Data

US 2024/0326932 A1 Oct. 3, 2024

(30) Foreign Application Priority Data

Oct. 13, 2020 (DE) ..................... 10 2020 126 874.2

(51) Int. Cl.
*B60J 7/22* (2006.01)
*B29C 45/14* (2006.01)
(Continued)

(52) U.S. Cl.
CPC ...... *B62D 35/005* (2013.01); *B29C 45/14065* (2013.01); *B60J 7/22* (2013.01);
(Continued)

(58) Field of Classification Search
CPC .................. B60J 7/22; B29C 45/14065; B29C 2045/14073; B29C 2045/14081;
(Continued)

(56) References Cited

U.S. PATENT DOCUMENTS 7,837,258 B2 * 11/2010 Bergmiller ................. B60J 7/22 296/217
9,248,728 B2 * 2/2016 Hiramatsu ................. B60J 7/22
(Continued)

FOREIGN PATENT DOCUMENTS

CN 208411381 U 1/2019
DE 102013000073 * 7/2014
(Continued)

OTHER PUBLICATIONS

International Search Report for PCT/EP2021/077221 mailed Jan. 31, 2022, in English and German (6 pages).
International Preliminary Report on Patentability for PCT/EP2021/077221 mailed Apr. 13, 2023, in English (7 pages).

*Primary Examiner* — Joseph D. Pape
(74) *Attorney, Agent, or Firm* — Fitch, Even, Tabin & Flannery, LLP

(57) ABSTRACT

A wind deflector device of a vehicle roof, having a wind deflector hoop, which is injection molded as a hollow profile by means of a fluid injection technique, and having a wind deflector net fastened to the wind deflector hoop, wherein the wind deflector net is fixedly connected to the injection molding material forming the wind deflector hoop by means of an injection-molded connection produced during the injection molding process, and to a mold for producing a wind deflector hoop.

12 Claims, 4 Drawing Sheets

(51) Int. Cl.
*B62D 35/00* (2006.01)
*B29L 31/30* (2006.01)

(52) U.S. Cl.
CPC ............... *B29C 2045/14122* (2013.01); *B29L 2031/3005* (2013.01)

(58) Field of Classification Search
CPC .. B29C 2045/1409; B29C 2045/14098; B29C 2045/14106; B29C 2045/14114; B29C 2045/14122; B29C 2045/14131; B29C 2045/14139; B29C 2045/14147; B29C 2045/14155; B29C 2045/14163; B29C 2045/14172
USPC ........................................................... 296/217
See application file for complete search history.

(56) References Cited

U.S. PATENT DOCUMENTS

| | | | | |
|---|---|---|---|---|
| 2008/0246306 | A1* | 10/2008 | Oerke | B60J 7/22 296/180.1 |
| 2013/0249255 | A1 | 9/2013 | Sawada et al. | |
| 2014/0252809 | A1 | 9/2014 | Eberst et al. | |
| 2021/0213815 | A1 | 7/2021 | Wimmer | |

FOREIGN PATENT DOCUMENTS

| | | | |
|---|---|---|---|
| DE | 102013203979 | A1 | 9/2014 |
| DE | 102014119272 | A1 | 6/2016 |
| EP | 2641763 | A2 | 9/2013 |
| WO | 2020069834 | A1 | 4/2020 |

* cited by examiner

WIND DEFLECTOR DEVICE HAVING A WIND DEFLECTOR HOOP

CROSS-REFERENCE TO RELATED APPLICATIONS

This application is a U.S. national phase application filed under 35 U.S.C. § 371 of International Application No. PCT/EP2021/077221, filed Oct. 4, 2021, designating the United States, which claims priority from German Patent Application Number 10 2020 126 874.2, filed on Oct. 13, 2020, which are hereby incorporated herein by reference in their entirety for all purposes.

FIELD

The invention relates to a wind deflector device of a vehicle roof, having a wind deflector hoop, which is injection molded as a hollow profile by means of a fluid injection technique, and having a wind deflector net fastened to the wind deflector hoop. The invention further relates to a mold for producing a wind deflector hoop of a wind deflector device on a vehicle roof by means of plastic injection molding, wherein at least two mold plates of the mold delimit a mold cavity in which the wind deflector hoop is injection molded as a hollow profile by means of a fluid injection technique.

BACKGROUND

WO 2020/069834 A1 discloses a wind deflector device of the type in question having a wind deflector hoop. Furthermore, a mold is specified by means of which the wind deflector hoop can be injection molded as a plastic profile in an internal gas pressure method. The wind deflector hoop is formed with a groove which is prepared for a wind deflector net to be attached to the wind deflector hoop by means of a fastening device.

SUMMARY

It is the underlying object of the invention to provide a wind deflector device mentioned at the outset which is improved in respect of the attachment of the wind deflector net, and to provide a mold for producing a wind deflector hoop.

In the case of the wind deflector device mentioned at the outset, the object is achieved according to the invention by the fact that the wind deflector net is fixedly connected to the injection molding material forming the wind deflector hoop by means of an injection-molded connection produced during the injection molding process.

Furthermore, the object is achieved according to the invention, in the case of the mold mentioned at the outset, by the fact that the closed mold holds a wind deflector net to be connected during injection molding to the wind deflector hoop in a fixing position, in which a fastening edge section of the wind deflector net is held in the mold cavity in an accurate position relative to the injection molding material forming the wind deflector hoop.

Advantageous refinements of the invention are each specified in the dependent claims.

The wind deflector hoop of the wind deflector device according to the invention is thus distinguished by the fact that the wind deflector net has been fixedly connected to the wind deflector hoop by means of an injection-molded connection directly during injection molding of the wind deflector hoop as a hollow profile in a mold using a fluid injection technique. An additional joining medium between the wind deflector net and the wind deflector hoop is not required. Furthermore, additional assembly processes or intermediate steps during production are not required. The wind deflector hoop produced with the fluid injection technique has a high stiffness and torsional strength. There is no need for additional stiffeners to be molded on or attached.

The fluid injection technique (FIT) or a method which uses the fluid injection technique comprises, in particular, the internal gas pressure or gas injection method (GIT or GID), the internal water pressure technique (WID) or the projectile injection technique (PIT). Even where reference is made below to the internal gas pressure or gas injection method, any of the techniques mentioned or any of the methods can always be employed.

The wind deflector net is preferably attached to a hollow profile wall of the wind deflector hoop and/or to a profile leg projecting from the hollow profile or from the hollow profile wall. The hollow profile wall is expediently shaped in such a way that a fastening point of the wind deflector net on the wind deflector hoop is not in the region of direct air impingement. A profile leg is expediently formed on or molded onto the hollow profile in such a way that the fastening point of the wind deflector net on the wind deflector hoop is preferably arranged on the underside of the wind deflector hoop and, in particular, is arranged outside the inflow side of the wind deflector hoop. For example, the wind deflector net can be mounted in a groove between a hollow profile wall of the wind deflector hoop and a profile leg projecting from the hollow profile or from the hollow profile wall. The wind deflector net expediently has at its upper edge a fastening edge section, by means of which the wind deflector net is fastened to the wind deflector hoop.

According to a preferred embodiment, it is envisaged that a fastening edge section of the wind deflector net has a positioning unit, which is connected to the wind deflector hoop together with the fastening edge section of the wind deflector net by means of the injection-molded connection. The fastening edge section of the wind deflector net is positioned on the wind deflector hoop in a defined position by means of the positioning unit. The fastening edge section of the wind deflector net is fixedly held by means of the positioning unit, in particular in or on the hollow profile wall and/or in or on the profile leg, in such a way that the internal gas pressure during injection molding cannot displace the fastening edge section from its defined position on the wind deflector hoop.

The positioning unit is expediently attached to the wind deflector net on a rear side, opposite a wind inflow direction, of the wind deflector net. A section of the hollow profile wall or of the profile leg on the front side of the fastening edge section of the wind deflector then does not have to accommodate the positioning unit, which could impair the shape, size or structure of the hollow profile wall or of the profile leg, in particular in a region that lies in the field of view of an observer. Thus, the injection molding material in this section can be formed with a constant thickness. With sufficient thickness of the injection molding material and corresponding design, however, it is also possible to provide for the positioning unit to be attached to the wind deflector net in a manner different from this.

The positioning unit is preferably formed in the form of a strip. The positioning unit or strip expediently extends over the entire length of the fastening edge section attached to the wind deflector hoop. The positioning unit or the strip is expediently bendable to such an extent that it can be accommodated in a mold in a configuration adapted to the shape of the wind deflector hoop and can be connected to the wind deflector hoop by injection-molded connection, in particular at the transition to the lateral raising arms. The cross section of the positioning unit or strip can be formed as a rectangle, as a rhombus or as a curved arc segment, for example. The positioning unit or the strip can, on its own or in conjunction with the wind deflector net, provide a fixing of the wind deflector net in the mold relative to the wind deflector hoop.

The positioning unit is preferably injection molded onto a lower wall section of the hollow profile wall of the wind deflector hoop and/or is at least partially embedded therein. However, other regions of the hollow profile or of the hollow profile wall can also be provided for the attachment of the wind deflector net.

The positioning unit can be attached to the wind deflector net, e.g. as a weld-on component. The positioning unit, which is preferably formed as an elongate profile or plastic profile, is, for example, thermally welded to the wind deflector net. The positioning unit can also be attached to the wind deflector net as an extruded-on component, as a 3D printed component or as an injection-molded component.

The wind deflector hoop is preferably mounted in such a way that it can be raised relative to the vehicle roof.

The wind deflector net is expediently provided at its lower edge with a connecting device or a keder which can be fixed to a component of the vehicle roof, e.g. by means of a plug-in connection. The connecting device or keder is preferably attached or injection molded to the wind deflector net when the wind deflector net is injection molded to the wind deflector hoop.

The profile leg is expediently arranged on the front side or on the air-guiding side of the wind deflector profile. However, the profile leg can also be arranged on the wind deflector profile on the rear side relative to the flow direction, or on the underside of the wind deflector profile.

The hollow profile produced by the fluid injection technique and, in particular, by the internal gas pressure method has a high strength in its one-piece design. Further stiffening parts to be mounted additionally on the wind deflector profile or wind deflector hoop are not necessary. Therefore, a largely continuous and smooth surface of the wind deflector profile can be achieved.

In its closed position, the mold according to the invention holds a wind deflector net to be connected during injection molding to the wind deflector hoop in a fixing position. This ensures that a fastening edge section of the wind deflector net is held in the mold cavity in an accurate position relative to the injection molding material forming the wind deflector hoop, even if the injection molding material is brought into its final shape under internal gas pressure and could displace the fastening edge section into an unwanted position in the process. However, such a displacement is prevented by the fixing.

According to a preferred embodiment, it is envisaged that at least one of the mold plates has an abutment section, which supports the fastening edge section of the wind deflector net against the internal pressure of the injected medium or injected internal gas pressure. The abutment section is configured in such a way that it can provide the required fixing. The abutment section is also configured in such a way that it allows the mold to be opened in a simple mold movement and the wind deflector hoop with the wind deflector net attached thereto to be removed easily from the mold.

A positioning unit is expediently attached to the fastening edge section of the wind deflector net. When the mold is closed, this positioning unit rests against the abutment section. The abutment section supports the positioning unit against displacement by the injected plastic injection molding material acted upon by the internal gas pressure. The positioning unit, together with the fastening edge section, can have a configuration that can be fixed to the abutment section. Thus, for example, the positioning unit together with the fastening edge section can form a, for example, wedge-shaped groove, into which the likewise wedge-shaped protruding abutment section engages. Other fixing engagement and support shapes can also be formed by the positioning unit alone or by the combination of the positioning unit with the fastening edge section.

The mold for injection molding a wind deflector hoop is preferably formed according to the preceding embodiments or according to one of claims 1 to 9.

BRIEF DESCRIPTIONS OF THE DRAWINGS

The invention is explained in more detail below, with reference to the drawing, by means of an exemplary embodiment of a wind deflector hoop according to the invention and of a mold for the production thereof. In the drawing.

DETAILED DESCRIPTION

Figure 1:
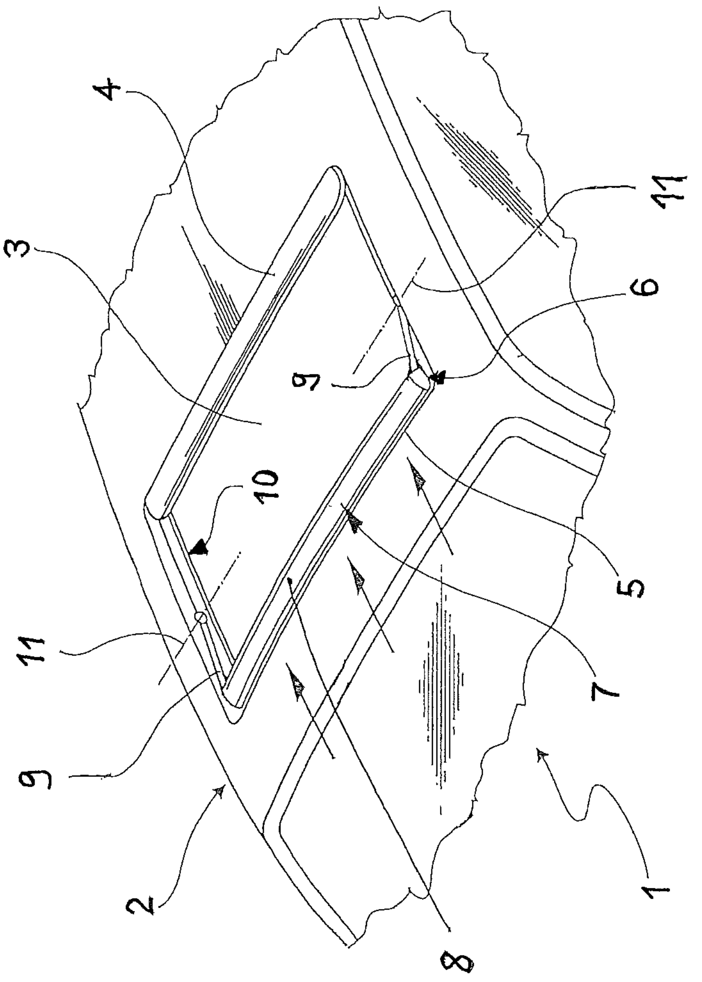
FIG. 1 shows, in a perspective view, a vehicle with an open vehicle roof and a raised wind deflector.
Figure 2:
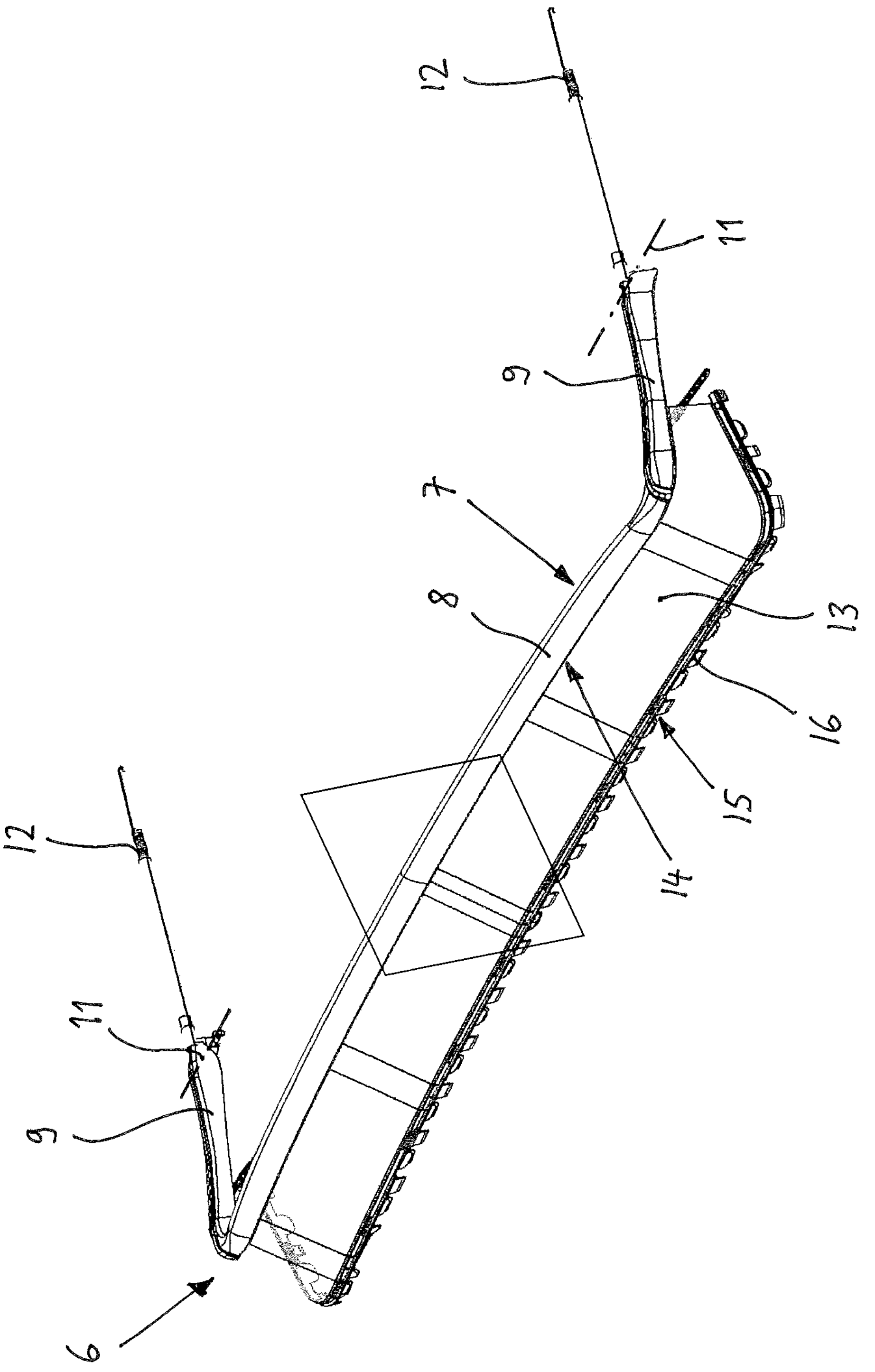
FIG. 2 shows, in a perspective view, the wind deflector with a wind deflector hoop and a wind deflector net.
Figure 3:
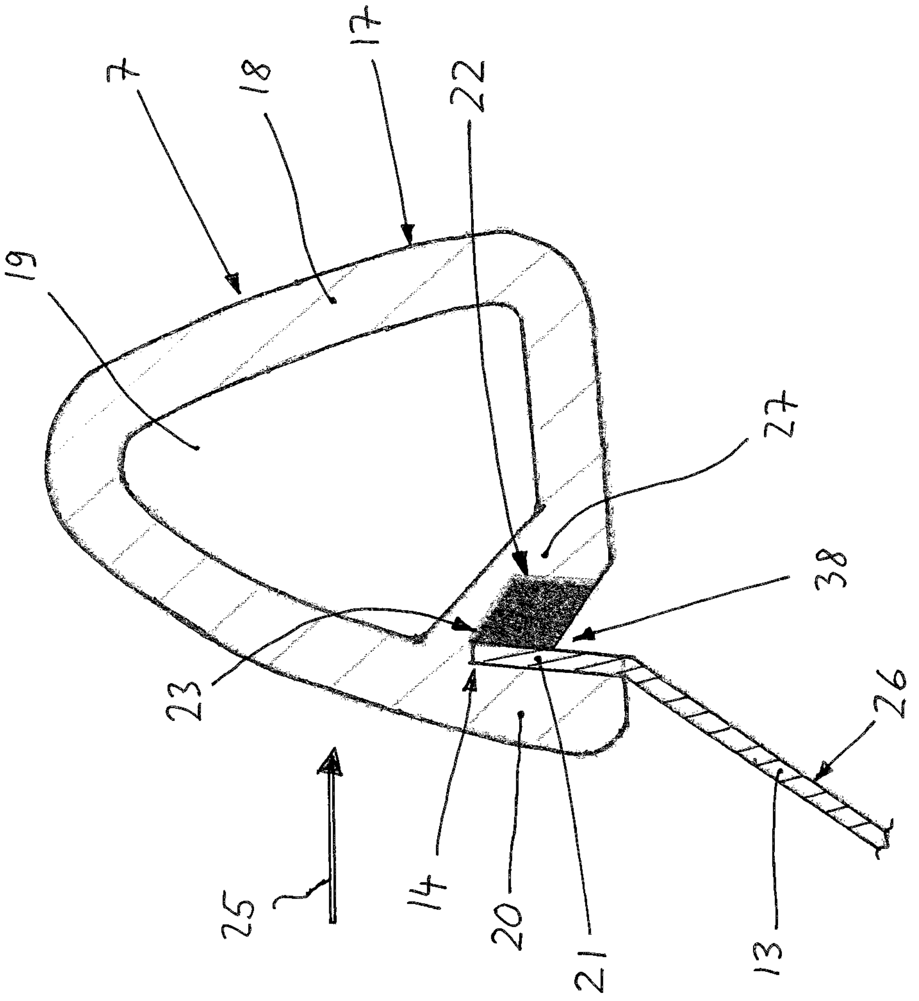
FIG. 3 shows, in a cross-sectional view, the wind deflector hoop.

A vehicle 1, such as a passenger car (see FIG. 1), contains a vehicle roof 2 having a roof opening 3 and a cover 4, for example, of a sliding roof, a sliding-lifting roof or an externally guided sliding roof, which can be adjusted in a known manner between a closed position, in which it closes the roof opening 3, and an open position, in which it opens the roof opening 3, as well as in intermediate positions. A wind deflector device 6 associated with a front edge 5 of the roof opening 3 contains a wind deflector hoop 7 having a central wind deflector profile 8 and lateral raising arms 9. At their rear ends, the raising arms 9 are mounted by means of a bearing on a roof frame 10 laterally delimiting the roof opening 3 so as to be pivotable about a fixed or movable transverse pivot axis 11. The two raising arms 9 are each preloaded in the raising direction by means of a tension spring 12. The cover 4 is in engagement with the raising arms 9 via a respective slider. In its closed position, the cover 4 holds the wind deflector hoop 7 pivoted down into a rest position by means of the two lowered raising arms 9. When the cover 4 is moved out of its closed position into an open position with the roof opening 3 at least partially exposed, it allows the two raising arms 9 to pivot upward, with the result that the wind deflector hoop 7 is pivoted out into a functional position.

The wind deflector device 6 contains a wind deflector net 13, which is connected at its upper edge 14 to the wind deflector hoop 7 and, at its lower edge 15, has a connecting device 16, such as a keder, by means of which the wind deflector net 7 is fastened, in particular releasably, to a component of the vehicle roof 2, for example the roof frame 10.

The wind deflector hoop 7 is injection molded as a hollow profile 17 from a plastic injection molding material by means of a fluid injection technique and, in particular, in a gas injection method. A hollow profile wall 18 of the hollow profile 17 surrounds a cavity 19 of the hollow profile 17.

The wind deflector net 13 is essentially attached to a profile leg 20 projecting from the hollow profile 17. The wind deflector net 13 contains, at its upper edge 14, a fastening edge section 21, to which a positioning unit 22 is attached. The positioning unit 22 is connected to the wind deflector hoop 7 together with the fastening edge 21 of the wind deflector net 13 by means of an injection-molded connection 23. The injection-molded connection 23 is produced during the injection molding process, in which an injection molding material forming the wind deflector hoop 7 is injected into an injection mold or mold 24.

The positioning unit 22 is formed in the form of a strip, for example. It extends over the length of the fastening edge section 21 attached to the wind deflector hoop 7. The wind deflector net 13 extends with its fastening edge section 21 longitudinally over the central wind deflector profile 8 and expediently over a front section of each lateral raising arm 9.

The positioning unit 22 is attached, for example, to the rear side 26, opposite a wind inflow direction (arrow 25), of the wind deflector net 13. The positioning unit 22 is injection molded onto a lower wall section 27 of the hollow profile wall 18 of the wind deflector hoop 7 and can additionally or alternatively be at least partially embedded on the lower wall section 27 of the hollow profile wall 18.

The mold 24 (see FIG. 4) for producing such a wind deflector hoop 7 has a mold cavity 28, which is delimited by a first, upper, mold plate 29, by a second, lower, mold plate 30 and by a third, lower, mold plate 31 of the closed mold 24. In the mold cavity 28, the wind deflector hoop 7 is injection molded as a hollow profile 17 in a gas injection method.

The two lower mold plates 30 and 31 are configured and arranged in their closed position in such a way that they form a gap 32 between them, in which the wind deflector net 13 is accommodated. The second, lower, mold plate 30 has a mold surface 33 which delimits the mold cavity 28, as well as an abutment section 34, which adjoins the gap 32 and has an abutment surface 35 as a continuation of the mold surface 33. The abutment section 34 has a wedge-shaped cross section between the abutment surface 35 for the positioning unit 22 and an abutment surface 36 for the fastening edge section 21, which abutment surface adjoins a gap surface 37, delimiting the gap 32, of the second, lower, mold plate 30.

The positioning unit 22 has a cross section in the form of a rhombus or a parallelogram, for example, and is configured and attached to the fastening edge section 21 in such a way that, together with the fastening edge section 21, it forms a V-shaped notch 38, the shape of which is matched to the wedge-shaped abutment section 34. The wind deflector net 13 is placed against the second, lower, mold plate 30 in such a way that the abutment section 34 is received in the V-shaped notch 38 in a precisely fitting manner. When the mold 24 is closed, the fastening edge section 21 with the positioning unit 22 is arranged in the mold cavity 28 in such a way that the upper edge 14 of the wind deflector net 13 projects into the mold cavity 24.

For the injection molding of the profile leg 20 of the hollow profile 17, a corresponding mold region 39 of the mold cavity 24 is provided, said region being delimited by a mold surface 40 of the first, upper, mold plate 29 and extending at least as far as in front of the abutment surface 36 of the abutment section 34. According to this exemplary embodiment, the mold region 39 can also extend as far as the third, lower, mold plate 31 and be delimited by the mold surface 41 thereof.

On its side situated opposite the positioning unit 22 and lying in the mold region 39, the fastening edge section 21 is thus free and without support there but is held in a fixing position on the abutment section 34 by the positioning unit 22.

When injection molding material is injected into the closed mold 24, the positioning unit 22, which is placed against the abutment surface 35 of the abutment section 34, holds the fastening edge section 21 of the wind deflector net 13 in a manner which supports it against the injected injection molding material, which is pressed outward against the mold surfaces of the mold 24 by the internal gas pressure in the cavity 19. The abutment surface 35 is preferably aligned approximately perpendicularly to a line extending from a center line of the mold cavity 24 and directed toward the abutment surface 35.

The injection molding material forms the hollow profile wall 18 and the profile leg 20. The fastening edge section 21 of the wind deflector net 13 is injection molded onto or into the inside of the leg 20. The positioning unit 22 is injection molded onto or into the wall section 27 of the hollow profile wall 18.

The positioning unit 22 can be attached to the wind deflector net 13 as a weld-on component, as an extruded-on component, as a 3D printed component or as an injection-molded component.

Figure 4:
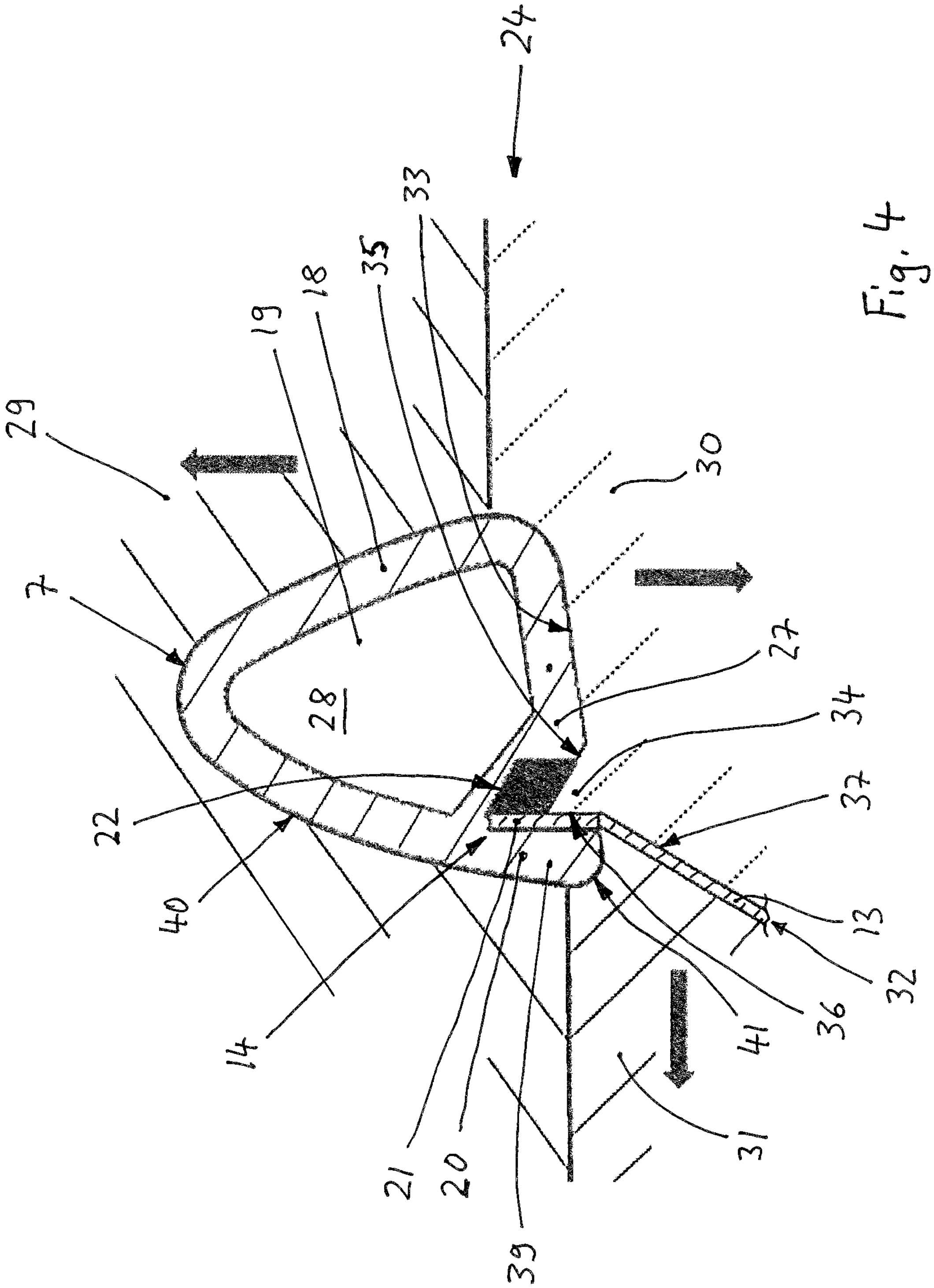
FIG. 4 shows, in a cross-sectional view, an injection mold with the wind deflector hoop molded therein.

The opening and closing movements of the mold plates 29, 30 and 31 are illustrated schematically by means of the respective arrows in FIG. 4, which show the direction of the opening movements.

The wind deflector hoop 7 produced by means of a fluid injection technique and, in particular, by means of the gas injection method or internal gas pressure method (GID) has a high stiffness and torsional strength. There is no need for additional stiffeners to be molded on or attached. The wind deflector net 13 is attached during the injection molding process for the wind deflector hoop 7, and therefore no additional assembly process is required for this purpose.

The invention claimed is:

1. A wind deflector device of a vehicle roof, having:

a wind deflector hoop, which is injection molded as a hollow profile by fluid injection, and having a wind deflector net fastened to the wind deflector hoop, wherein the wind deflector net is fixedly connected to the injection molding material forming the wind deflector hoop by an injection-molded connection produced during the injection molding process, and wherein a fastening edge section of the wind deflector net has a positioning unit, which is connected to the wind deflector hoop together with the fastening edge section of the wind deflector net by the injection-molded connection.

2. The wind deflector device as claimed in claim 1, wherein the wind deflector net is attached to a hollow profile wall of the wind deflector hoop and/or to a profile leg projecting from the hollow profile or from the hollow profile wall.

3. The wind deflector device as claimed in claim 1, wherein the positioning unit, which is formed in the form of a strip, extends over the length of the fastening edge section attached to the wind deflector hoop.

4. The wind deflector device as claimed in claim 1, wherein the positioning unit is attached to the wind deflector net on a rear side, opposite a wind inflow direction, of the wind deflector net.

5. The wind deflector device as claimed in claim 1, wherein the positioning unit is injection molded onto a lower wall section of the hollow profile wall of the wind deflector hoop and/or is at least partially embedded therein.

6. The wind deflector device as claimed in claim 1, wherein the positioning unit is attached to the wind deflector net as a weld-on component, as an extruded-on component, as a 3D printed component or as an injection-molded component.

7. The wind deflector device as claimed in claim 1, the wind deflector hoop is mounted in such a way that it can be raised relative to the vehicle roof.

8. The wind deflector device as claimed in claim 1, wherein the wind deflector net is provided at its lower edge with a connecting device or a keder which can be fixed to a component of the vehicle roof.

9. A mold for producing a wind deflector hoop of a wind deflector device on a vehicle roof by plastic injection molding, wherein at least two mold plates of the mold delimit a mold cavity in which the wind deflector hoop is injection molded as a hollow profile by a fluid injection technique, and wherein the closed mold holds a wind deflector net to be connected during injection molding to the wind deflector hoop in a fixing position, in which a fastening edge section of the wind deflector net is held in the mold cavity in an accurate position relative to the injection molding material forming the wind deflector hoop.

10. The mold as claimed in claim 9, wherein one of the mold plates has an abutment section, which supports the fastening edge section of the wind deflector net against the internal pressure of the injected medium.

11. The mold as claimed in claim 10, wherein the abutment section supports a positioning unit attached to the fastening edge section of the wind deflector net against the internal pressure of the injected medium.

12. The mold as claimed in claim 9, wherein the mold is formed for injection molding a wind deflector hoop as claimed in claim 1.

* * * * *